United States Patent
Hirasawa et al.

(10) Patent No.: US 7,500,609 B2
(45) Date of Patent: Mar. 10, 2009

(54) MEDIUM PROCESSING DEVICE

(75) Inventors: Kenji Hirasawa, Nagano (JP); Kazutoshi Ishikawa, Nagano (JP); Yasuhiro Kitazawa, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 348 days.

(21) Appl. No.: 11/496,603

(22) Filed: Jul. 31, 2006

(65) Prior Publication Data

US 2007/0080225 A1 Apr. 12, 2007

Related U.S. Application Data

(63) Continuation-in-part of application No. 10/635,340, filed on Aug. 6, 2003, now Pat. No. 7,281,656.

(30) Foreign Application Priority Data

Mar. 29, 2006 (JP) ............................. 2006-091431

(51) Int. Cl.
*G06K 7/08* (2006.01)

(52) U.S. Cl. ...................... 235/449; 235/439; 235/493; 235/380

(58) Field of Classification Search ................ 235/449, 235/379, 380, 381, 493, 475, 486, 439
See application file for complete search history.

(56) References Cited

U.S. PATENT DOCUMENTS

| 4,510,381 | A | * | 4/1985 | Fukatsu | 194/350 |
|---|---|---|---|---|---|
| 5,398,798 | A | * | 3/1995 | Ericson | 194/202 |
| 5,850,079 | A | * | 12/1998 | Ohwa et al. | 235/475 |
| 6,527,187 | B1 | * | 3/2003 | Nagata et al. | 235/475 |
| 7,143,934 | B2 | * | 12/2006 | Ghisani | 235/379 |
| 2003/0234153 | A1 | * | 12/2003 | Blake et al. | 194/347 |
| 2006/0054457 | A1 | * | 3/2006 | Long et al. | 194/347 |

FOREIGN PATENT DOCUMENTS

JP 2001-067525 3/2001

* cited by examiner

*Primary Examiner*—Edwyn Labaze
(74) *Attorney, Agent, or Firm*—Reed Smith LLP

(57) ABSTRACT

A medium processing device is provided having a front panel which is formed with an aperture where a magnetic recording medium is inserted into or ejected from and which partitions an outside of a device from an inside of the device. A magnetic head is provided in the inside of the device for writing or reading information in or from the magnetic recording medium a shading filter is provided in at least one part of the front panel for shading visible light and a foreign matter detecting mechanism is provided on an inner side of the device with respect to the shading filter for detecting a foreign matter that is attached to the outside of the device.

9 Claims, 11 Drawing Sheets

[Fig. 1]
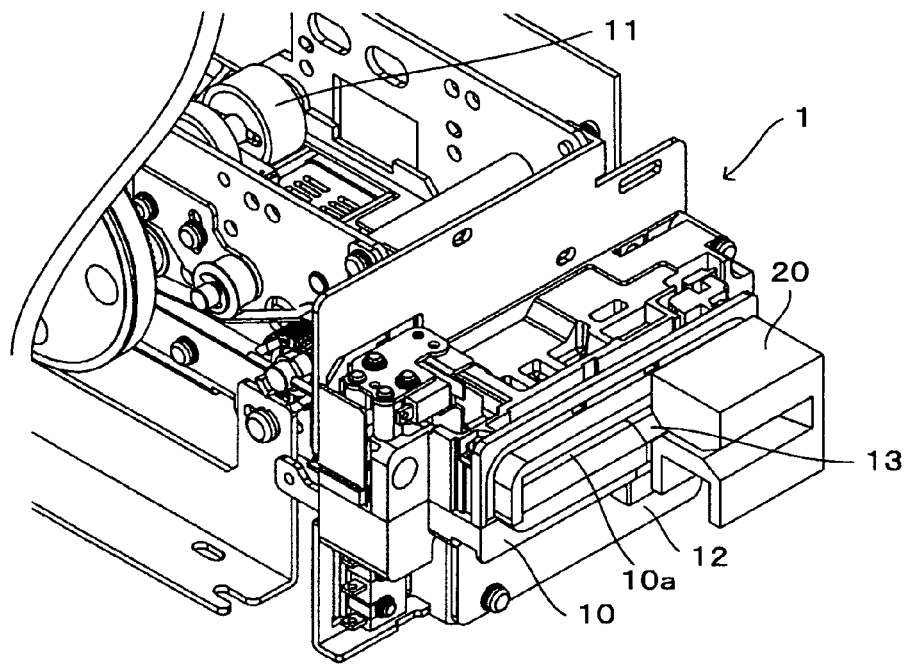
(a)
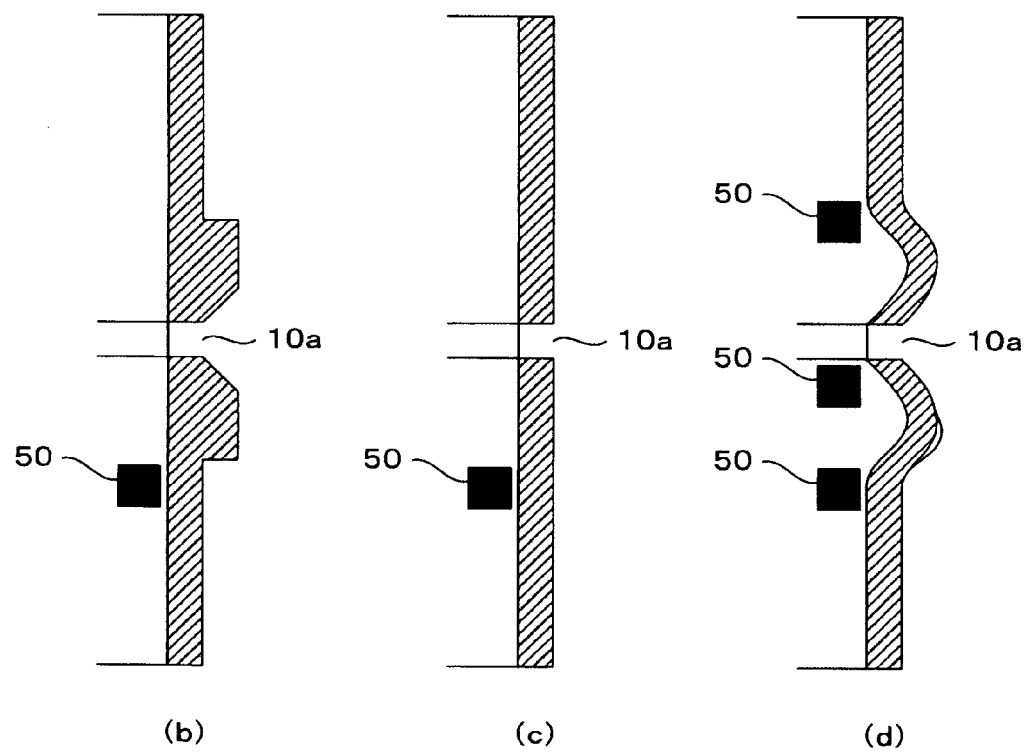
(b)　　　　　　　(c)　　　　　　　(d)

[Fig. 2]
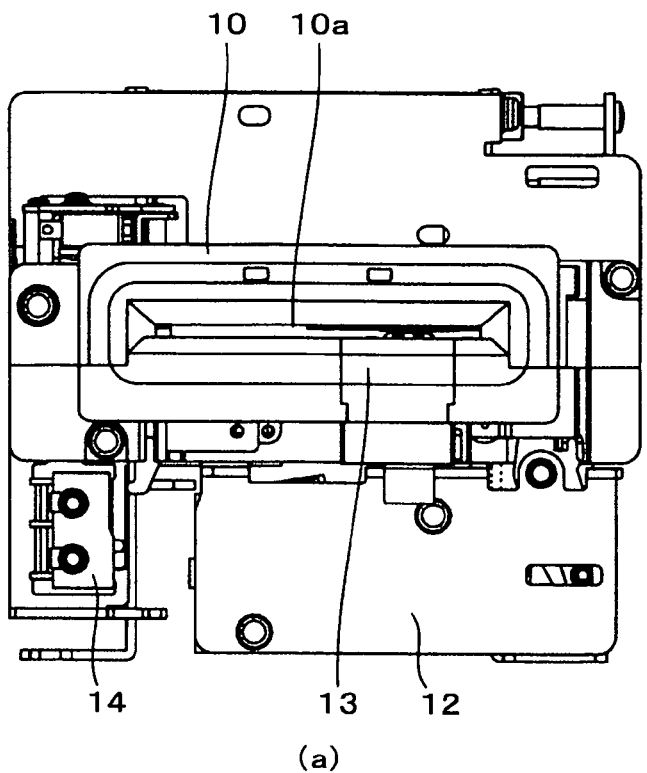
(a)
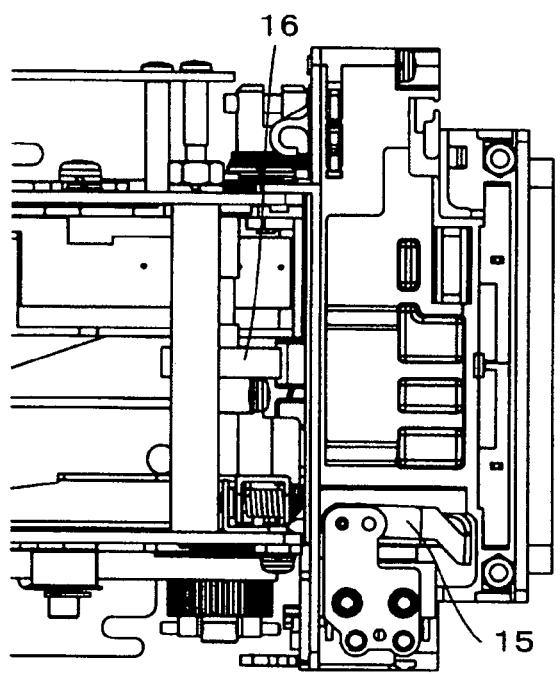
(b)

[Fig. 3]
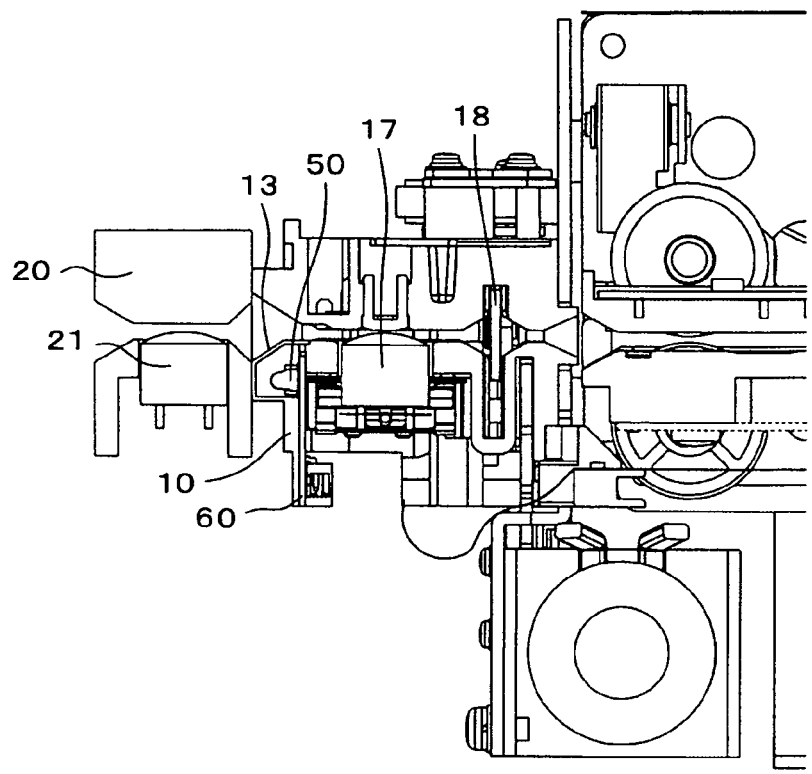
[Fig. 4]
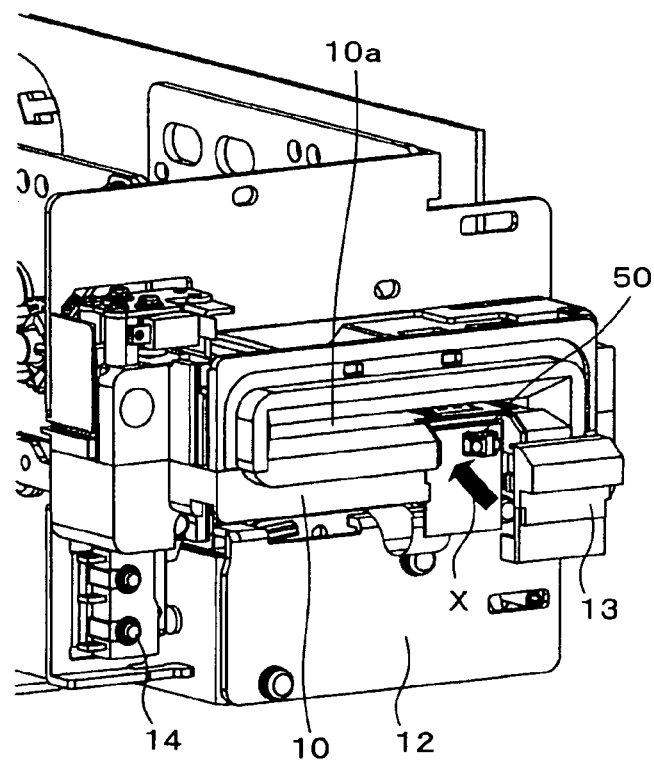

[Fig. 5]
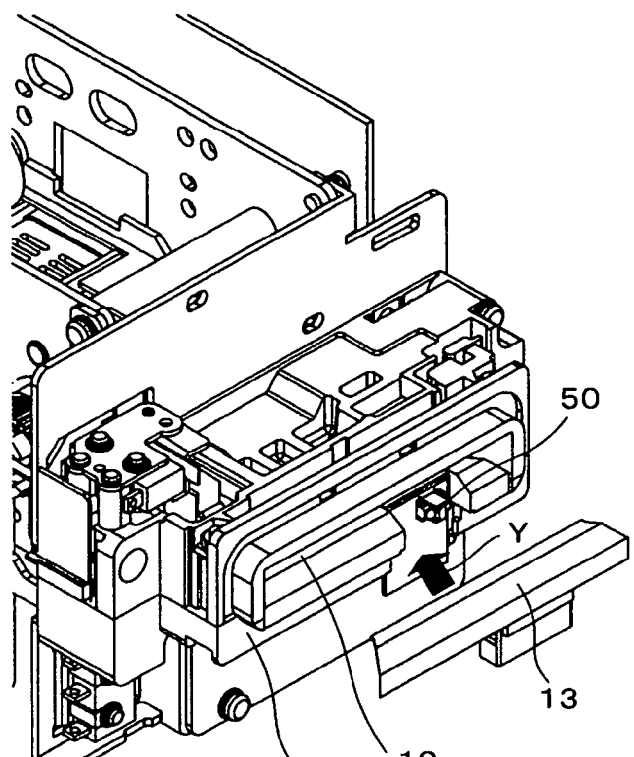
(a)
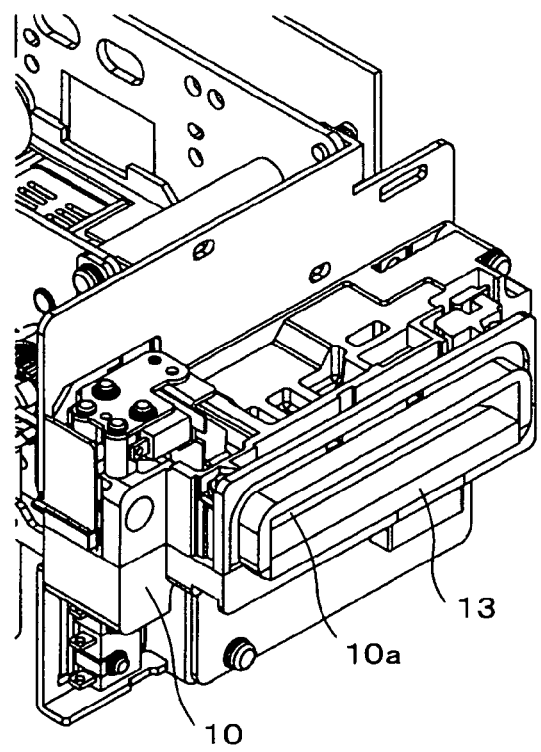
(b)

[Fig. 6]
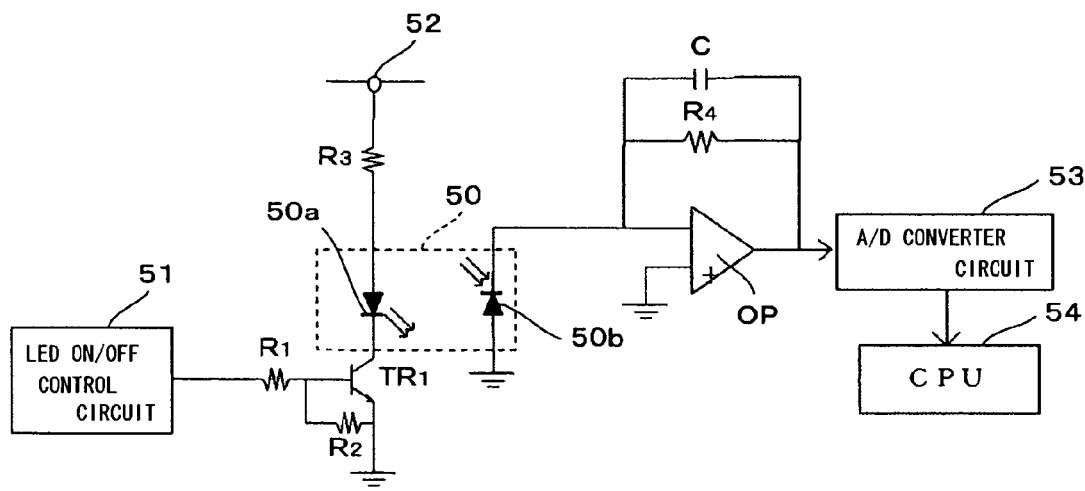

[Fig. 7]
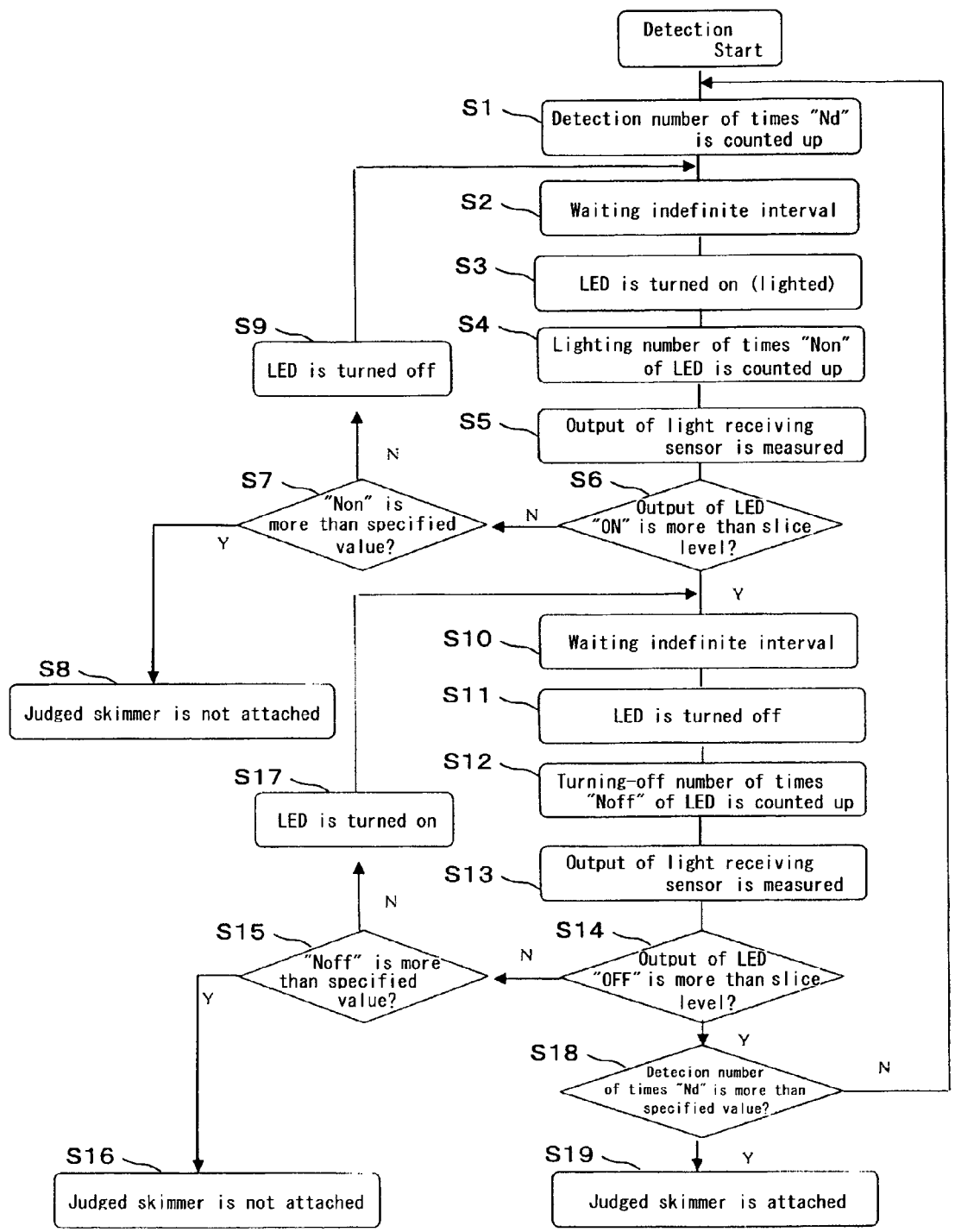

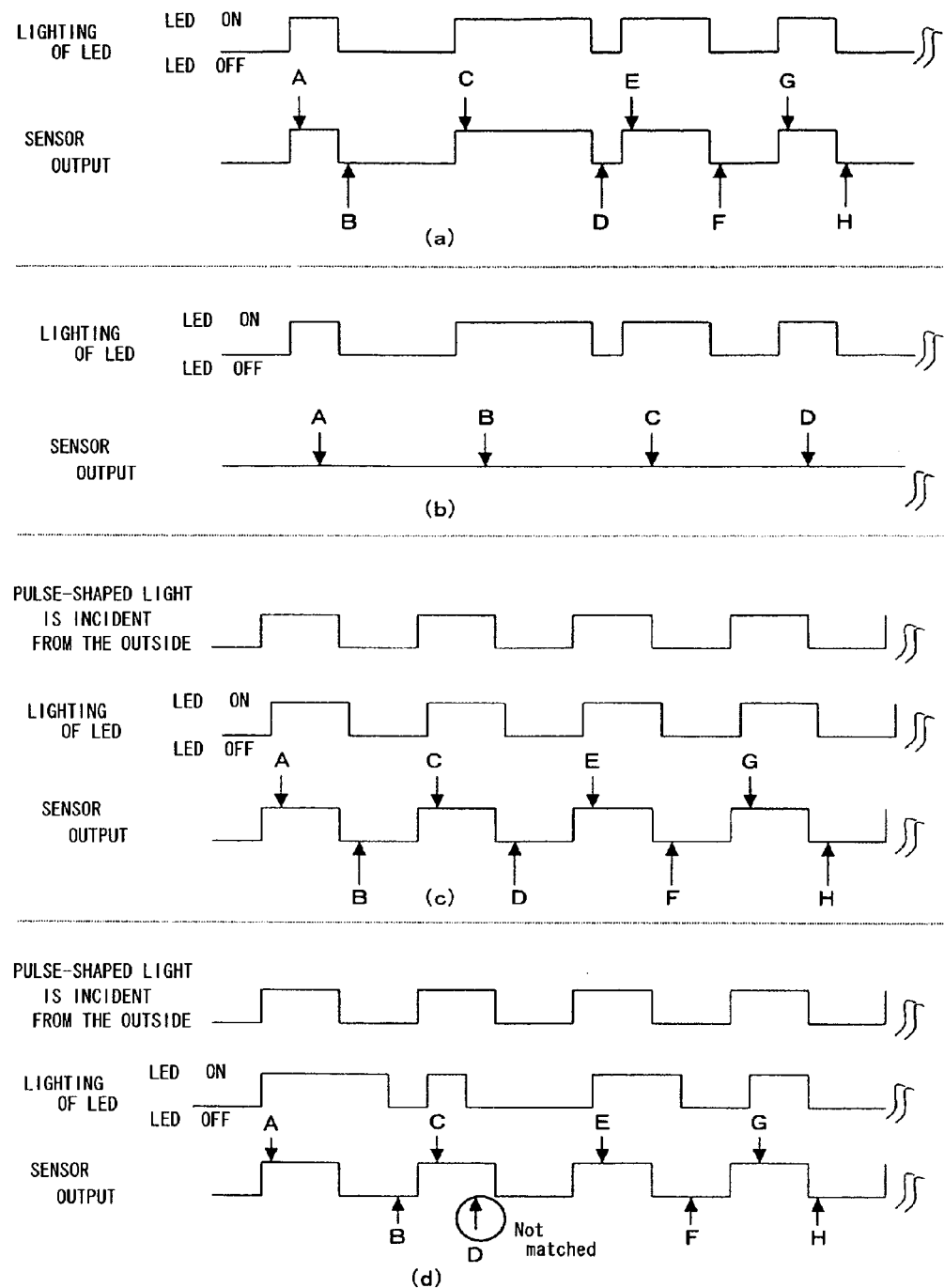
[Fig. 8]

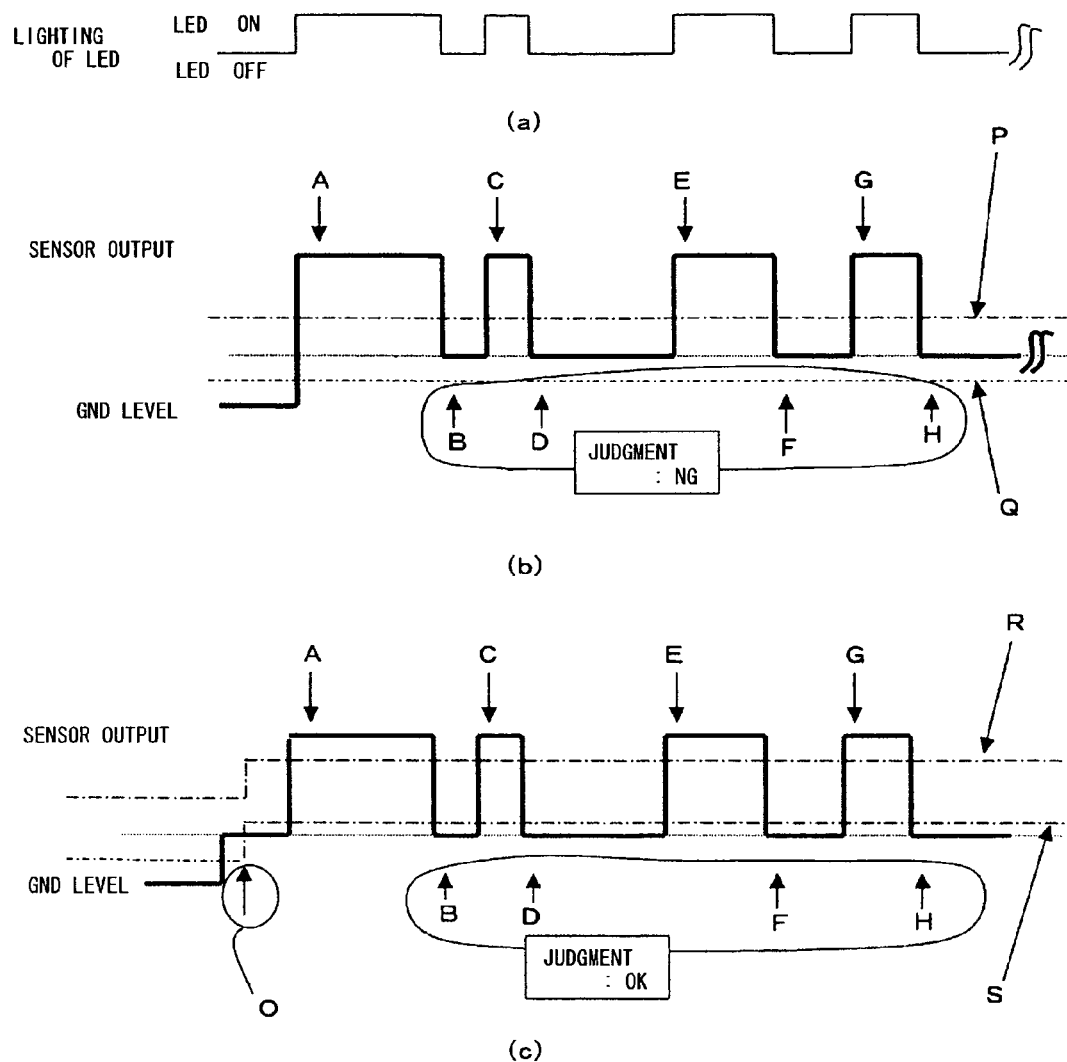
[Fig. 9]

[Fig. 10]
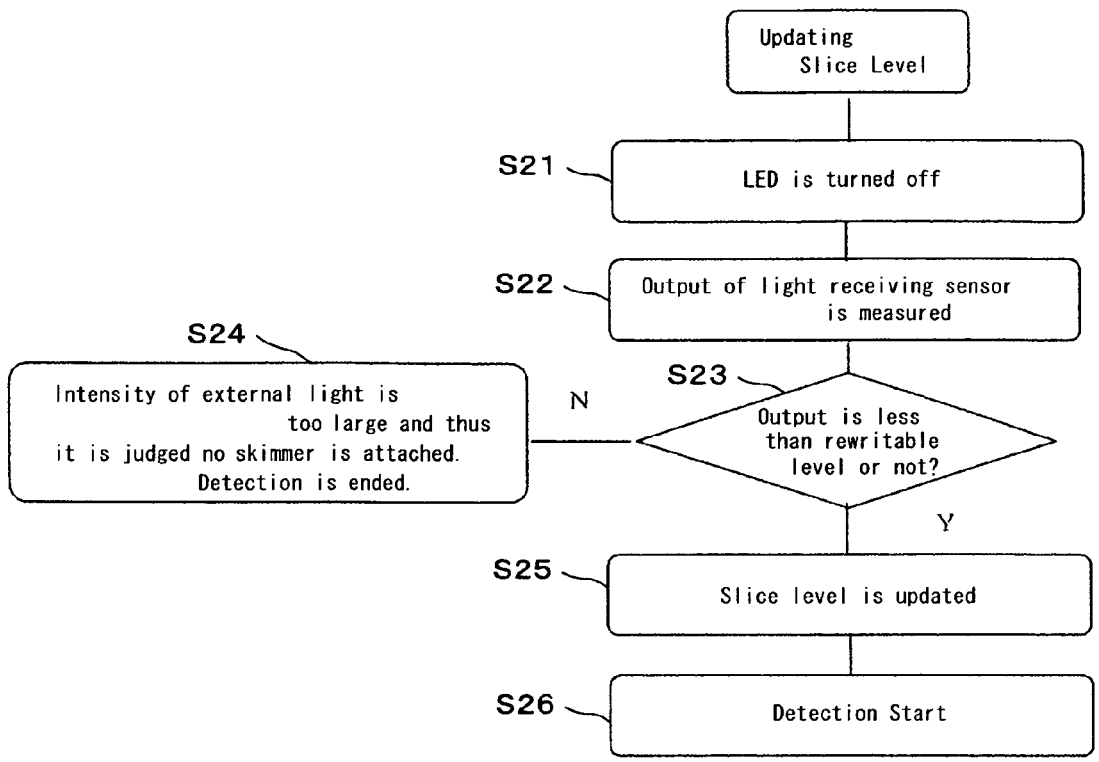
[Fig. 11]
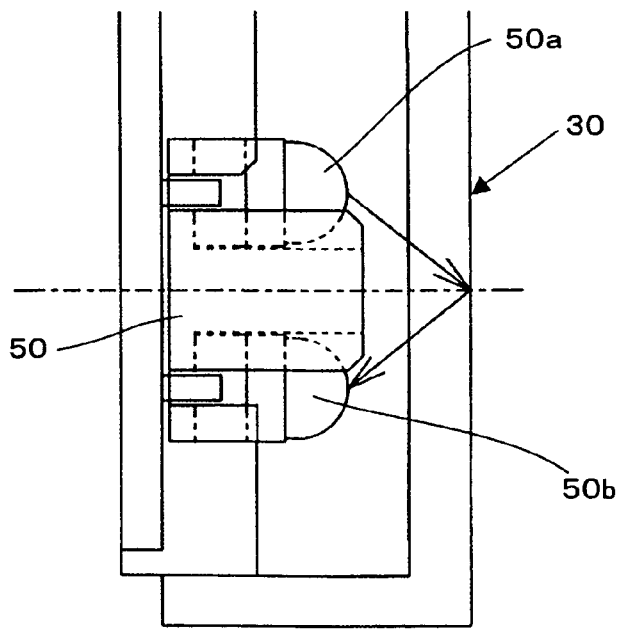

[Fig. 12]
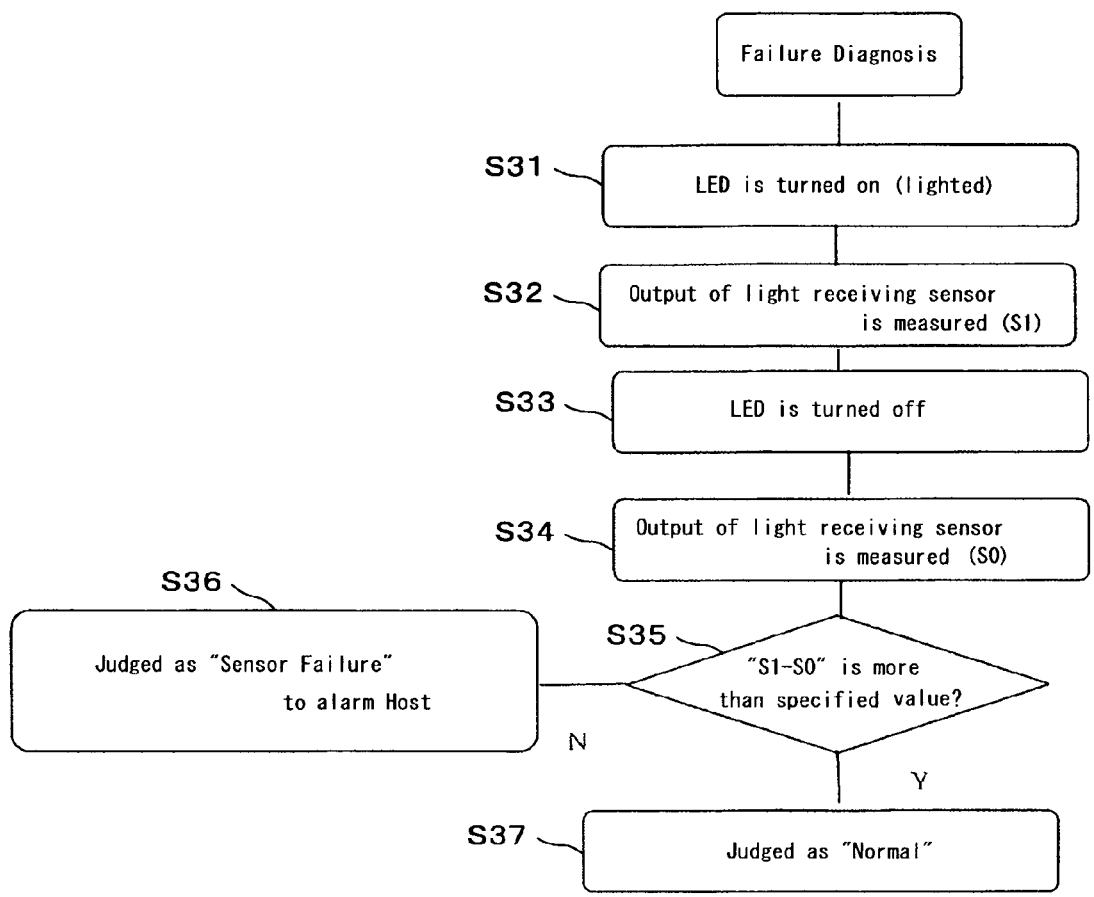

[Fig. 13]
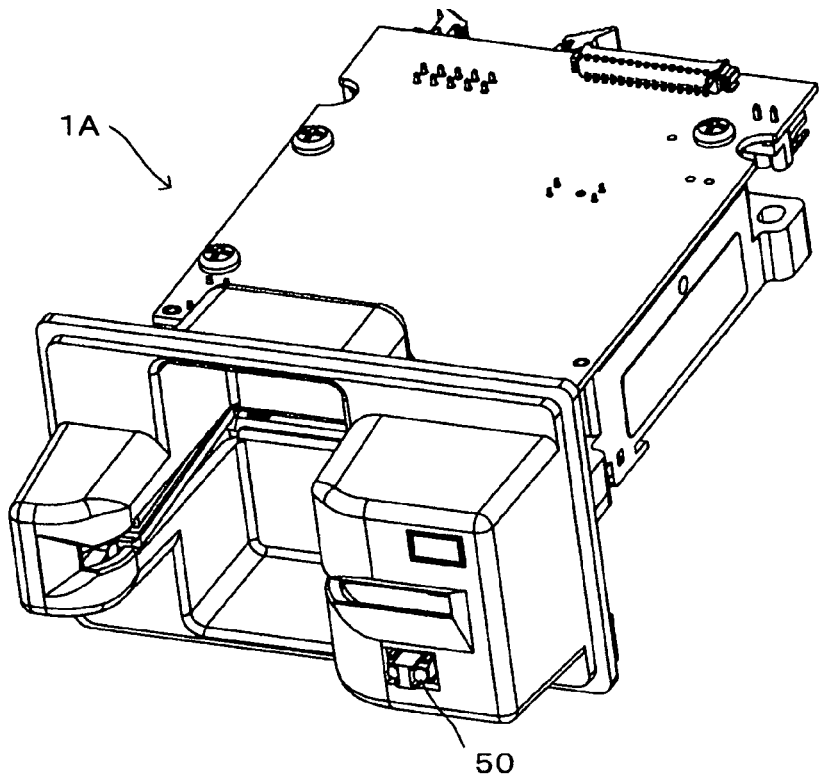
[Fig. 14]
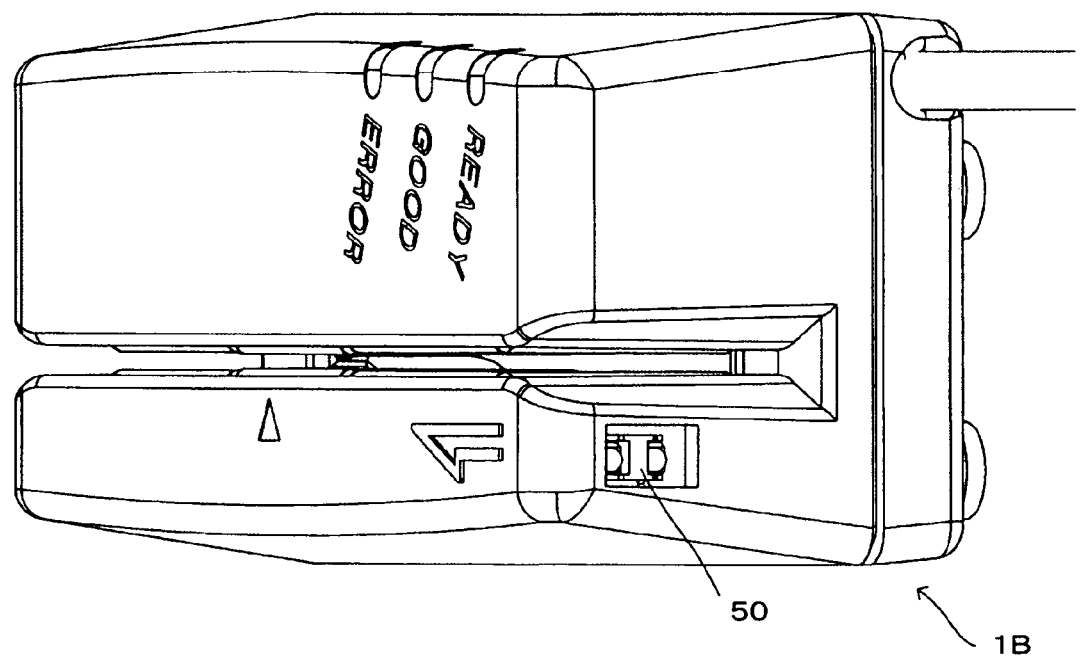

MEDIUM PROCESSING DEVICE

CROSS REFERENCE TO RELATED APPLICATIONS

The present application is a continuation-in-part application based on U.S. patent application Ser. No. 10/635,340 filed on Aug. 6, 2003, now U.S. Pat. No. 7,281,656 which claims priority to U.S. application Ser. No. 09/611,501 filed on Jul. 7, 2000, the complete disclosures of which are hereby incorporated by reference.

FIELD OF THE INVENTION

The present invention may relate to a medium processing device which is provided with a function for preventing illegal reading (illegal reading preventing function) from a magnetic card

BACKGROUND OF THE INVENTION

A magnetic card reader which performs reading and writing magnetic data from and on a magnetic card is commonly mounted in an ATM or the like, which is, for example, installed in a bank. The magnetic card reader includes a card slot for inserting and ejecting a magnetic card, a detector for detecting the magnetic card which has been inserted from the card slot, a card introducing passage on which the magnetic card inserted from the card slot is guided to the inside of the magnetic card reader, and a shutter for opening or closing the card introducing passage.

First, a user inserts a tip end of a magnetic card into the card slot. Then, the insertion of the magnetic card is detected by the detector, and the shutter having closed the card introducing passage is opened and, at the same time, the magnetic card is taken into the inside of the magnetic card reader by rollers provided in the card introducing passage. In the magnetic card reader, the taking-in operation of a magnetic card is performed in this manner.

Recently, a device which illegally reads information recorded on a magnetic card has been becoming a social problem. The illegal reading device is disposed at the front (outside) of the card slot of the magnetic card reader and provided with a magnetic head for illegally reading information recorded on the magnetic card. When a magnetic card is inserted into the card slot (a pseudo-card slot) of the magnetic card reader on which an illegal reading device is mounted, information recorded on the magnetic card is read by the magnetic head without being perceived by a user.

Therefore, medium processing devices have been developed which are provided with a function for preventing illegal reading from a magnetic card. As an example of such the medium processing devices, a magnetic card transaction device has been disclosed, for example, in Japanese Patent Laid-Open No. 2001-67525. The magnetic card transaction device disclosed in this reference is provided with a reflecting type photo sensor which detects a foreign matter (illegal reading device) fitted to the vicinity of the card slot. The reflecting type photo sensor is disposed on the inner side of a front panel which partitions the outside from the inside of the device. A light-transmitting hole for detecting a foreign matter is formed on a front side of the reflecting type photo sensor in the front panel.

When the magnetic card transaction device structured as described above is used, in the event that a foreign matter is fitted to the vicinity of the card slot, the light quantity of a light beam, which is emitted from a light emitting body and is incident on the reflecting type photo sensor through the light-transmitting hole, is varied and thus the fitting of the foreign matter can be detected. Therefore, in this case, an alarm signal is transmitted to a host device, or a shutter that opens or closes a card introducing passage has been kept closed, and thus illegal reading from a magnetic card can be prevented.

However, in the magnetic card transaction device disclosed in the above-mentioned reference, when an illegal person who is going to attach a foreign matter notices the light-transmitting hole, it is conceivable that the person takes an action to suspend the illegal reading preventing function, for example, by damaging the reflecting type photo sensor disposed in the inside of the light-transmitting hole or causing unnecessary light beam to be incident into the light-transmitting hole. Therefore, in order to maintain the illegal reading preventing function and improve the reliability of a magnetic card reader, it is necessary to develop a technique with which the presence of the reflecting type photo sensor is difficult to be recognized from the outside.

Further, in the conventional technique with which the variation of the light quantity is detected with the reflecting type photo sensor through the light-transmitting hole as described above, an erroneous detection due to external (outside) light such as sunlight or indoor fluorescent lamps may occur depending on the environment where the magnetic card reader is installed.

SUMMARY OF THE INVENTION

In view of the problems described above, an embodiment of the present invention may advantageously provide a medium processing device in which a sensor for detecting a foreign matter is set to be difficult to be recognized from the outside to improve the illegal reading preventing function and which is capable of improving reliability by reducing an erroneous detection due to the external light.

Thus, according to embodiments of the present invention, there may be provided the following medium processing devices.

A medium processing device comprising a front panel which is formed with an aperture where a magnetic recording medium is inserted into or ejected from and which partitions an outside of a device from an inside of the device, a magnetic head which is provided in the inside of the device for writing or reading information in or from the magnetic recording medium, a shading filter which is provided in at least one part of the front panel for shading visible light, and a foreign matter detecting mechanism which is provided on an inner side of the device with respect to the shading filter for detecting a foreign matter that is attached to the outside of the device.

According to this embodiment, the medium processing device includes a front panel formed with an aperture and partitioning the outside of a device from the inside of the device, a magnetic head provided in the inside of the device, a (visible light) shading filter provided in at least one part of the front panel, and a foreign matter detecting mechanism which is provided on an inner side of the device with respect to the shading filter for detecting a foreign matter that is attached to the outside of the device. Therefore, since the shading filter is provided, it is difficult that the foreign matter detecting mechanism is visually confirmed from the outside.

Accordingly, the possibility that the foreign matter detecting mechanism is recognized from the outside is reduced and the illegal reading preventing function (security performance) can be improved. Further, since the shading filter is provided with a visible light blocking function, an erroneous detection in the foreign matter detecting mechanism due to visible light can be reduced to improve reliability.

In this specification, "shading visible light" means that visible light is completely shaded and, in addition, that the visible light is partly shaded. In other words, "shading" in this specification means that the shading rate is less than 100% in addition that the shading rate is equal to 100%. Further, "foreign matter detecting mechanism" may be structured with any means which is capable of detecting a foreign matter that is attached to the outer side of the device, and may utilize, for example, a photo reflector, a microwave sensor, a metal detection sensor or the like.

The medium processing device further provides that the foreign matter detecting mechanism comprises a light emitting body for emitting invisible light and a light receiving sensor for receiving the invisible light, and the shading filter transmits the invisible light.

According to this embodiment, the foreign matter detecting mechanism comprises a light emitting body (light emitting element) for emitting invisible light (infrared light, for example) and a light receiving sensor (light receiving element) for receiving the invisible light, and the shading filter transmits the invisible light. Therefore, it can be detected that a foreign matter is attached by means of that, when the light emitting body is turned on, the variation of the light quantity received by the light receiving sensor is detected. In addition, it becomes difficult by using the shading filter that the light emitting body and the light receiving sensor are visually confirmed from the outside. Accordingly, the illegal reading preventing function (security performance) can be improved.

The medium processing device provides that the invisible light is infrared light.

According to this embodiment, the invisible light is infrared light. Therefore, for example, with the use of a widely spread infrared LED, the illegal reading preventing function can be simply improved at a low cost.

The medium processing device provides that the foreign matter detecting mechanism comprises a light emission control section for controlling the light emitting body and a comparing section for comparing an emitted light from the light emitting body with a received light in the light receiving sensor.

According to this embodiment, the foreign matter detecting mechanism comprises a light emission control section for controlling the light emitting body and a comparing section for comparing an emitted light from the light emitting body with a received light in the light receiving sensor. Therefore, when the light emitting body is turned on (light is emitted) by the light emission control section, a characteristic difference between the emitted light from the light emitting body and the received light in the light receiving sensor (for example, a difference of the light quantities, a difference of the time periods of the lights or a difference of the timings of the lights) can be detected by the comparing section. Accordingly, the foreign matter can be accurately detected.

The medium processing device provides that the light emitting body in the foreign matter detecting mechanism is turned on an off flickeringly at random or pseudo-random time intervals and, when the light receiving sensor receives the invisible light at time intervals that coincide with the time intervals of the emitted light from the light emitting body, it is judged that a foreign matter is attached to the outside of the front panel.

According to this embodiment, the light emitting body in the foreign matter detecting mechanism is turned on and off flickeringly at random or pseudo-random time intervals and, when the light receiving sensor receives the invisible light at time intervals that coincide with the time intervals of the emitted light from the light emitting body, it is judged that a foreign matter is attached to the outside of the front panel. Therefore, the attachment of a foreign matter can be accurately detected. In other words, when the light receiving sensor receives the invisible light depending on the artificial timing of the emitted light from the light emitting body, which is flickeringly turned on or off at random or pseudo-random time intervals, it is judged that the possibility that the received light is natural light such as sunlight is extremely low and thus it can be accurately determined that a foreign matter is attached.

The medium processing device provides a light that is emitted from the light emitting body in the foreign matter detecting mechanism at the timing of turning on a power source of the device, and when an output of received light in the light receiving sensor is not more than a specified value, it is judged that abnormality occurs in the foreign matter detecting mechanism.

According to this embodiment, light is emitted from the light emitting body in the foreign matter detecting mechanism at the timing of turning on a power source of the device, and, for example, the emitted light is reflected by a cover disposed in front of the foreign matter detecting mechanism and, when an output of received light in the light receiving sensor is not more than a specified value, it is judged that abnormality occurs in the foreign matter detecting mechanism. Therefore, a failure diagnosis for the sensor can be performed at the time when the power source of the device is turned on. In other words, the medium processing device in accordance with this embodiment is provided with a self-diagnosis function for failure.

The medium processing device provides that the shading filter transmits invisible light, the foreign matter detecting mechanism comprises a light receiving sensor for receiving the invisible light, and a light emitting body for emitting invisible light is provided in the outside of the device.

According to this embodiment, the foreign matter detecting mechanism comprises a light receiving sensor for receiving the invisible light and a light emitting body for emitting invisible light is provided in the outside of the device. Therefore, the exchange of the light emitting body can be easily performed and thus versatility is enhanced. Further, the light emitting body provided in the outside of the device is effectively utilized and only the light receiving sensor is provided in the inside of the device, and thus cost can be reduced.

The medium processing device further provides that the foreign matter detecting mechanism performs detection for a foreign matter in a waiting state for insertion of the magnetic recording medium or at a time when the insertion of the magnetic recording medium is detected.

According to this embodiment, the foreign matter detecting mechanism performs detection for a foreign matter in a waiting state for insertion of the magnetic recording medium or at a time when the insertion of the magnetic recording medium is detected. Therefore, the detection for a foreign matter is performed, for example, whenever a card is used in the medium processing device and thus the illegal reading preventing function (security performance) can be improved.

In one embodiment, the magnetic recording medium is a card having a magnetic stripe, and a detection region of the foreign matter detecting mechanism is set to be a region which faces a passage of the magnetic stripe of the card.

According to this embodiment, the detection region of the foreign matter detecting mechanism is set to be a region which faces a passage of the magnetic stripe that is provided on a surface of the magnetic recording medium (magnetic card). Therefore, the accuracy of the illegal reading preventing function can be enhanced. In other words, in a magnetic card that has been commonly used, the position of the magnetic stripe of a magnetic card is determined by the technical standard, and thus a foreign matter is assumed to be attached to the vicinity of the passage of the magnetic stripe of a magnetic card. Accordingly, the region that faces the passage of the magnetic stripe of a magnetic card is set to be a detection region for the foreign matter detecting mechanism to accurately detect the attachment of a foreign matter.

The medium processing device further provides a warning that is notified to a user or to a host device or a processing to the magnetic recording medium is suspended when the foreign matter detecting mechanism detects the foreign matter.

According to this embodiment, a warning is notified to a user or to a host device or a processing to the magnetic recording medium is suspended when the foreign matter detecting mechanism detects the foreign matter. Therefore, it can be prevented information recorded in a magnetic recording medium from being read out by a foreign matter in advance, and thus the illegal reading preventing function can be improved.

According to the medium processing device in accordance with the present invention, since the sensor for detecting a foreign matter is difficult to be recognized from the outside, the illegal reading preventing function can be improved. Further, an erroneous detection due to external light is reduced to enhance the reliability for the detection of a foreign matter.

BRIEF DESCRIPTION OF THE DRAWINGS

FIG. 1(a) is a perspective view showing a mechanical structure of a card reader in accordance with an embodiment of the present invention. FIGS. 1(b) through 1(d) are explanatory side views showing different shapes of an opening portion in the card reader and mounting positions of a photo reflector.

FIG. 2(a) is a front view showing the card reader shown in FIG. 1(a) which is viewed from the front side and FIG. 2(b) is its plan view which is viewed from above.

FIG. 3 is a longitudinal sectional view showing the card reader shown in FIG. 1(a) which is longitudinally cut so as to include a shading filter and a skimmer.

FIG. 4 is a perspective view showing a state where a shading filter is fitted to the card reader shown in FIG. 1(a).

FIGS. 5(a) and 5(b) are perspective views showing other arrangements of a shading filter.

FIG. 6 is a block diagram showing an electrical circuit relating to a photo reflector.

FIG. 7 is a flow chart showing a flow that detects a foreign matter.

FIGS. 8(a) through 8(d) are waveform diagrams showing sensor outputs of photo reflectors which are detected in a CPU when a foreign matter is detected.

FIGS. 9(a) through 9(c) are waveform diagrams showing states where a slice level is updated.

FIG. 10 is a flow chart showing a flow of information processing when a slice level is updated.

FIG. 11 is an explanatory schematic view showing an outline on the failure diagnosis of a photo reflector.

FIG. 12 is a flow chart showing a flow of information processing when a failure diagnosis of a photo reflector is performed.

FIG. 13 is a perspective view showing a state where a photo reflector is mounted on a DIP type of a card reader.

FIG. 14 is a perspective view showing a state where a photo reflector is mounted on a swipe type of a card reader.

DETAILED DESCRIPTION OF THE PREFERRED EMBODIMENTS

An embodiment of the present invention will be described below with reference to the accompanying drawings.

FIG. 1(a) is a perspective view showing a mechanical structure of a card reader 1 in accordance with an embodiment of the present invention. FIG. 2(a) is a front view showing the card reader 1 shown in FIG. 1(a) that is viewed from the front side and FIG. 2(b) is its plan view that is viewed from above. In this embodiment, a card reader is used as a medium processing device, but the present invention is not limited to a card reader. FIG. 1(a) and FIGS. 2(a) and 2(b) illustrate the front portion of the card reader 1.

In FIG. 1(a), the card reader 1 is provided with a front panel 10 in which an opening 10a for inserting or ejecting a magnetic card is formed and which partitions the outside from the inside of a device. In the perspective view in FIG. 1(a), since a device case is removed, the inside of the device is visible. However, since the device case is commonly attached, the inside of the front panel 10 in the device is invisible. The opening 10a functions as a card slot for inserting and ejecting a magnetic card.

Any arranging area, shape, size and the like of the front panel 10 may be utilized when the front panel 10 partitions the inside of the device from the outside and is capable of permitting the insertion and the ejection of a magnetic card into and from the opening 10a. For example, an opening portion including the opening 10a (slot) may be formed, as shown in FIG. 1(b), to be the same shape as that shown in FIG. 1(a), or the opening portion may be formed in a flat face shape as shown in FIG. 1(c). Further, a photo reflector 50 (see FIG. 3) described below is preferably positioned near the opening (see the photo reflector 50 at a middle position in FIG. 1(d)) but the photo reflector 50 may be positioned apart from the opening, for example, at the upper or the lower position as shown in FIG. 1(d).

A magnetic head for writing or reading information on or from a magnetic card is provided in the inside of the device. A magnetic head, which is invisible in FIG. 1(a) or FIGS. 2(a) and 2(b), is disposed under a feeding roller 11 through a feeding passage. The writing or reading of information is performed by the magnetic head that contacts with and slides on a magnetic stripe of the magnetic card. The magnetic head includes, for example, a magnetic core which is disposed so as to sandwich a gap (spacer), a winding coil for writing which is wound around the magnetic core, a winding coil for reading which is wound around the magnetic core, and a case which houses the magnetic core, the winding coil for writing and the winding coil for reading.

When a magnetic card is inserted into the opening 10a, a width detection switch 15 (see FIG. 2(b)) for detecting a length in a widthwise direction of the magnetic card is turned "ON". Then, a shutter solenoid 12 (see FIG. 2(a)) is actuated to open a shutter 18 that has closed the feeding passage (see FIG. 3) and, as a result, a shutter opening and closing switch 14 (see FIG. 2(a)) is tuned "ON". Then, the rotating operation of a take-in roller 16 (see FIG. 2(b)) arranged in the feeding passage is started to take the magnetic card into the inside of the card reader 1. In this manner, the taking-in operation of the magnetic card is performed in the card reader 1.

As an example, it is supposed that, as shown in FIG. 1(a), an illegal device (skimmer) 20 for illegally reading information which is recorded on a magnetic card is attached on the front side of the front panel 10 of the card reader 1. In the card reader 1 in accordance with this embodiment, a photo reflector 50 (see FIG. 3) described below is provided as an example of a foreign matter detecting means for detecting the skimmer 20 being attached. Further, in order that the photo reflector 50 is difficult to be visible from the outside, as shown in FIG. 1(a) and FIG. 2(a), a shading filter 13 for shading visible light is arranged in a part of the front panel 10. Positional relationship between the photo reflector 50 and the shading filter 13 is described in detail with reference to FIG. 3.

FIG. 3 is a longitudinal sectional view showing the card reader 1 shown in FIG. 1(a) which is longitudinally cut so as to include the shading filter 13 and the skimmer 20. In FIG. 1(a) and FIGS. 2(a) and 2(b), the width detection switch 15 is used as a trigger for opening or closing the shutter 18. However, in FIG. 3, a pre-head 17 (magnetic head) for checking whether information (magnetic data) is present in a magnetic card or not in advance is further used as the trigger. For example, when a new card or the like on which magnetic data will be written from now on is inserted, the pre-head 17 recognizes the card as a card on which magnetic data is not present and thus transactions may be prohibited. Therefore, in this embodiment, both the width detection switch 15 and the pre-head 17 are used.

As shown in FIG. 3, a skimmer 20 having a magnetic head 21 for illegally reading information recorded in a magnetic card is mounted on the front side of the front panel 10 of the card reader 1 (left side in FIG. 3). The position of a magnetic stripe on the surface of a magnetic card is determined by the ISO specification (standard) and thus the position where the skimmer 20 is attached can be estimated by taking into consideration of the height of the card feeding passage.

Therefore, a photo reflector 50 for detecting the skimmer 20 is disposed at a position shown in FIG. 3. In other words, the detection region by the photo reflector 50 is set to be a region where the photo reflector 50 faces a passing route of the magnetic stripe of a card. In this case, it is preferable that the disposed position of the photo reflector 50 is at the front of the pre-head 17. Further, for example, a combination of a photo-diode (photo-transistor) and an LED may be used as another foreign matter detecting means. However, in an embodiment, the photo reflector 50 is used as a foreign matter detecting means and thus mounting space can be reduced. In accordance with an embodiment, an LED light source of the photo reflector 50 is preferably an infrared LED. When an infrared LED is used, an illegal person may not recognize the photo reflector 50 that emits a light for detection. Further, a coating for blocking a light with a wavelength other than the infrared light may be applied to a light receiving sensor 50b of the photo reflector 50 (see FIG. 6 described below). According to the structure described above, a light other than the infrared light which is incident on the light receiving sensor 50b from the outside can be prevented.

A shading filter 13 for blocking visible light and transmitting infrared light is disposed in front of the photo reflector 50. Specifically, as shown in FIG. 4, the shading filter 13 is separately fitted to the front panel 10 as one part of the front panel 10 (see the arrow "X" in FIG. 4). FIG. 4 is a perspective view showing a state where the shading filter 13 is fitted to the card reader shown in FIG. 1(a).

In accordance with an embodiment, the shading filter 13 is provided as one part of the front panel 10 but may be, for example, provided in the entire lower portion (spread portion or throat portion) which forms one part of the opening 10a in the front panel 10 as shown in FIGS. 5(a) and 5(b). FIGS. 5(a) and 5(b) are perspective views showing other arrangements of a shading filter. As shown in FIG. 5(a), when the entire lower portion is formed with the shading filter 13, an illegal person cannot recognize which portion is formed with a shading filter (see FIG. 5(b)) when the shading filter 13 is mounted on the front panel 10 (see the arrow "Y" in FIG. 5(a)). In this manner, the security can be improved.

As described above, according to the mechanical structure of the card reader 1 shown in FIG. 1(a) through FIGS. 5(a) and 5(b), it is difficult to visually confirm the photo reflector 50 from the outside by the shading filter 13. Therefore, the possibility of recognizing the existence of the photo reflector 50 from the outside is reduced and thus the illegal reading preventing function (security) can be improved. Next, an electrical structure for operating the photo reflector 50 in the card reader 1 will be described in detail below.

FIG. 6 is a block diagram showing an electrical circuit relating to the photo reflector 50. An LED on/off control circuit 51, an A/D converter circuit 53 and a CPU 54 are disposed on a control board (not shown) in the card reader 1 and other electrical elements are disposed on a sensor circuit board 60 shown in FIG. 3. Alternatively, for example, an operational amplifier OP in FIG. 6 may be disposed on the above-mentioned control board and the electrical arrangement may be adequately modified.

In FIG. 6, the photo reflector 50 is structured of a light emitting body 50a which emits infrared light and a light receiving sensor 50b for receiving the infrared light. A cathode of the light emitting body 50a is connected with a collector terminal of a transistor TR1. A control signal from the LED on/off control circuit 51 is inputted to a base terminal of the transistor TR1 through a base resistor R1. A pull-down resistor R2 is connected between the base terminal and an emitter terminal of the transistor TR1 for preventing the input to the transistor TR1 from being in an opened state and the emitter terminal of the transistor TR1 is connected to the earth. Further, an anode of the light emitting body 50a is connected with a power source 52 through a load resistor R3.

An anode of a light receiving sensor 50b is connected to the earth and a cathode of the light receiving sensor 50b is connected with an inverting input terminal of the operational amplifier OP. A non-inverting input terminal of the operational amplifier OP is connected to the earth. Further, a parallel circuit comprised of a feedback resistor $R_4$ and a capacitor C is connected between the inverting input terminal and an output terminal of the operational amplifier OP. A sensor output from the operational amplifier OP is passed through the A/D converter circuit 53 to be digitized and inputted to the CPU 54.

The LED on/off control circuit 51 functions as an example of a light emission control section which controls the emission of light from the light emitting body 50a. The CPU 54 functions as an example of a comparing section which compares the received light in the light receiving sensor 50b with the emitted light from the light emitting body 50a.

A flow for detecting a foreign matter by using the photo reflector 50 will be described in detail below with reference to FIG. 7 and FIGS. 8(a) through 8(d) on the basis of the electrical structure described above. FIG. 7 is a flow chart showing the flow for detecting a foreign matter. FIGS. 8(a) through 8(d) are waveform diagrams showing sensor outputs of the photo reflector 50 which are detected in the CPU 54 when a foreign matter is to be detected. FIG. 8(a) is a waveform diagram when a skimmer 20 is attached, FIG. 8(b) is a waveform diagram when a skimmer 20 is not attached, FIG. 8(c) is a waveform diagram when an erroneous detection is occurred by external light, and FIG. 8(d) is a waveform diagram when external light is present but an erroneous detection is not occurred. First, a case when a skimmer 20 is attached will be described below.

In FIG. 7, at first, a count-up of a variable showing a detection number of times is performed (step S1). More specifically, the LED on/off control circuit 51 counts up (increment) a variable "Nd" by one in a memory region such as a memory (RAM or the like) arranged in the inside of the LED on/off control circuit 51. In this manner, "1" is substituted for the variable "Nd" whose initial value is "0".

Next, the LED on/off control circuit 51 performs an LED lighting (turn on) processing after having waited with an indefinite (irregular) interval (step S2). More specifically, the LED on/off control circuit 51 has determined a plurality of random time intervals (intervals of $T_1$ second, $T_2$ second, $T_3$ second, $T_4$ second, . . . ) in advance by using, for example, a random number generator provided in the inside of the LED on/off control circuit 51 and stored them in the memory. Then, the LED on/off control circuit 51 waits until a first time interval (the interval of $T_1$ second) determined above has passed. After that, when it is judged that the first time interval has passed, a control signal (ON signal) is transmitted to the transistor $TR_1$ to turn on the transistor $TR_1$ and a collector current is supplied to the light emitting element 50a. Therefore, the light emitting body 50a is turned on or lighted (step S3).

Next, a count-up of a variable "Non" which means the lighting number of times of the LED is performed (step S4). More specifically, similarly to the step S1, a count-up of the variable "Non" is performed in a memory region of a memory provided in the inside of the LED on/off control circuit 51. In this manner, "1" is substituted for the variable "Non" whose initial value is "0".

Next, the measurement of the output of the light receiving sensor 50b is performed (step S5). More specifically, when the LED is turned on by the LED on/off control circuit 51, the CPU 54 detects a sensor output (digital data) of the photo reflector 50 which is obtained through the operational amplifier OP and the A/D converter circuit 53.

Next, it is judged whether the sensor output (output level) which is measured in the step S5 is not less than a predetermined slice level (predetermined voltage) or not (step S6). More specifically, the CPU 54 judges whether the sensor output is not less than the predetermined slice level or not.

As described above, when the skimmer 20 is attached, the result of "YES" is obtained by the processing of the step S6. In other words, as shown in FIG. 8(a), the CPU 54 detects a sensor output from the photo reflector 50 (see the arrow "A" in the drawing) immediately after the LED is first lighted (ON). In this case, a reflected light is occurred by the skimmer 20 and thus it is judged that the sensor output is not less than the predetermined slice level and the Result of "YES" is obtained by the processing of the step S6.

Next, after the LED on/off control circuit 51 has waited with an indefinite interval (step S10), the LED on/off control circuit 51 performs an LED turning-off processing (step S11). More specifically, the LED on/off control circuit 51 waits until the time interval $T_2$ has passed and then, when it is judged that the time interval $T_2$ has passed, the transmission of the control signal to the transistor $TR_1$ is stopped (in other words, an OFF signal is transmitted). As a result, the transistor $TR_1$ is turned off and thus a collector current is not supplied to the light emitting body 50a to cause the light emitting body 50a to be turned off (step S11).

Next, similarly to the step S4 and the step S5, a count-up of a variable "Noff" that means the turning-off number of times of the LED is performed (step S12) and the measurement of the output of the light receiving sensor 50b is performed (step S13). Then, it is judged whether the sensor output (output level) which is measured in the step S13 is not more than a predetermined slice level (predetermined voltage) or not (step S14). More specifically, the CPU 54 judges whether the sensor output is not more than the predetermined slice level or not.

As described above, when the skimmer 20 is attached, the result of "YES" is obtained by the processing of the step S14. In other words, as shown in FIG. 8(a), the CPU 54 detects the sensor output of the photo reflector 50 (see the arrow "B" in FIG. 8(a)) immediately after that the LED is first turned off (OFF). In this case, the reflected light from the skimmer 20 does not occur and, in FIG. 8(a), it is assumed that a level shift due to external light is not occurred, in other words, the entire sensor output is not increased by a constant value by the external light. Therefore, it is judged that the sensor output is not more than a predetermined slice level and thus the result of "YES" is obtained by the processing of the step S14. A countermeasure to the level shift due to the external light will be described below with reference to FIG. 9.

Next, it is judged whether the variable "Nd" which means the detected number of times is not less than a predetermined specified value or not (step S18). More specifically, the LED on/off control circuit 51 judges whether the variable Nd (current value is "1") is not less than the predetermined specified value or not. In accordance with an embodiment shown in FIG. 7, the predetermined specified value is "4" and thus the first processing of the step S18 results in "NO" and the processing is returned to the step S1. After that, the processing of the step S1 through the step S6, the step S10 through the step S14, and the step S18 is repeated three times in total. The measurements of the sensor output in the step S5 and the step S13 are performed as shown in FIG. 8(a) such that the arrow "A" and the arrow "B" show the first measurements, the arrow "C" and the arrow "D" show the second measurements, the arrow "E" and the arrow "F" show the third measurements, and the arrow "G" and the arrow "H" show the fourth measurements.

When the fourth measurement has finished and the processing of the step S18 results in "YES" (when the variable "Nd" showing the detected number of times is "4"), the CPU 54 judges that the skimmer 20 is attached in the card reader 1 (step S19). In this manner, it is detected that the skimmer 20 is attached.

When the skimmer 20 is detected to be attached in the card reader 1, in accordance with an embodiment, a warning is transmitted to its host device (ATM or the like). Further, the CPU 54 and the LED on/off control circuit 51 are transmitted and received information to and from each other and are capable of communicating data required to detect a foreign matter with each other. In the flow chart shown in FIG. 7, it is judged each time whether the sensor output of the photo reflector 50 is not less than (or not more than) the predetermined slice level or not (see the step S6 and the step S14). However, for example, a memory (RAM or the like) may be connected with the CPU 54 and, after the data has been accumulated in the memory, the data may be collectively judged later.

Next, a case where the skimmer 20 is not attached will be described below with reference to FIG. 7 and FIG. 8(b). The details of the processing of the step S1 through the step S6 and the step S10 through the step S14 are similar to the above-mentioned description and thus their description is omitted.

In FIG. 7, firstly, the processing of the step S1 through the step S5 is performed. Then, since the skimmer 20 is not attached in the card reader, the result of "NO" is obtained by the processing of the step S6. In other words, as shown in FIG. 8(b), the CPU 54 detects the sensor output of the photo reflector 50 (see the arrow "A" in the drawing) immediately after that the LED is lighted (turned ON) first. However, in this case, since there is no reflected light from the skimmer 20, it is judged that the sensor output is not more than a predetermined slice level and the result of "NO" is obtained by the processing of the step S6.

Next, it is judged whether the variable "Non" showing the lighting number of times of the LED is not less than the predetermined specified value or not (step S7). More specifically, the LED on/off control circuit 51 judges whether the variable "Non" (current value is "1") is not less than the predetermined specified value or not. In accordance with an embodiment shown in FIG. 7, since the predetermined specified value is "4", the first processing of the step S7 indicates "NO" and, after the light emitting element 50a is turned off (step S9), the process is returned to the step S2.

After that, the processing of the step S2 through the step S6 is repeated three times in total. The measurements of the sensor output in the step S5 are performed as shown in FIG. 8(b) such that the arrow "A" shows the first measurement, the arrow "B" shows the second measurement, the arrow "C" shows the third measurement, and the arrow "D" shows the fourth measurement.

When the fourth measurement has finished and the processing of the step S7 indicates "YES" (when the variable "Non" showing the lighting number of times of the LED is "4"), the CPU 54 judges that the skimmer 20 is not attached in the card reader 1 (step S8). In this manner, it is detected that no skimmer 20 is attached.

Next, a case where an erroneous detection occurs due to external (outside) light will be described below with reference to FIG. 7 and FIG. 8(c). This erroneous detection occurs when the time interval is not indefinite interval but a periodical interval. In other words, in the LED on/off control circuit 51, a periodical time interval (intervals of $T_1$ second, $T_1$ second, $T_1$ second, . . . ) is determined.

As shown in the upper diagram in FIG. 8(c), when a pulse-shaped light is incident on the light receiving sensor 50b from the outside (or from a gap space between the front panel and the shading filter 13), an erroneous detection may occur by performing the process shown in FIG. 7.

More specifically, as shown in the lower diagram in FIG. 8(c), the sensor output of the photo reflector 50 varies in a pulse-shaped manner by the external light shown in the upper diagram in FIG. 8(c). Therefore, as shown in the middle diagram in FIG. 8(c), the CPU 54 detects the sensor output of the photo reflector 50 (see the arrow "A" in the drawing) immediately after that the LED is lighted (turned ON) first (the first step S3 in FIG. 7). In this case, it is judged that the sensor output is not less than a predetermined slice level due to the pulse-shaped external light and thus the result of "YES" is obtained by the processing of the step S6. After that, in FIG. 8(c), the CPU 54 detects the sensor output of the photo reflector 50 (see the arrow "B" in the drawing) immediately after that the LED is turned off (OFF) first. In this case, the pulse-shaped external light is also in an off state (see the upper diagram in FIG. 8(c)) and a level shift due to the external light does not occur in FIG. 8(c), and thus it is judged that the sensor output is not more than the predetermined slice level and the result of "YES" is obtained by the processing of the step S14. Afterwards, similarly to the case described with reference to FIG. 8(a), the measurements of the sensor output in the step S5 and the step S13 are performed such that the arrow "A" and the arrow "B" show the first measurements, the arrow "C" and the arrow "D" show the second measurements, the arrow "E" and the arrow "F" show the third measurements, and the arrow "G" and the arrow "H" show the fourth measurements.

As described above, in FIG. 8(c), although a skimmer 20 is not attached to the card reader 1, an erroneous detection that the skimmer 20 is attached is obtained similarly to the case in FIG. 8(a). Therefore, in accordance with an embodiment, as shown in FIG. 8(d), a plurality of random time intervals (intervals of $T_1$ second, $T_2$ second, $T_3$ second, $T_4$ second, . . . ) is used. As a result, the erroneous detection that occurs in the case shown in FIG. 8(c) is avoided.

More specifically described, as shown in the upper diagram in FIG. 8(d), it is assumed that, for example, a pulse-shaped light is incident on the light receiving sensor 50b from the outside (or from a gap space between the front panel and the shading filter 13). At the time of the first measurements for the sensor output, in other words, when the first processing of the step S5 and the step S13 in FIG. 7 (see the arrow "A" and the arrow "B" in FIG. 8(d)) are performed, the sensor outputs are respectively not less than a predetermined slice level or not more than a predetermined slice level and thus the process is returned to the step S1.

However, at the time of the second measurement for the sensor output, in other words, when the second processing of the step S5 and the S13 in FIG. 7 are performed, both measured sensor outputs (see the arrow "C" and the arrow "D" shown in FIG. 8(d)) are not less than the predetermined slice level (see the arrow "D" shown in FIG. 8(d)). As a result, since the result of "NO" is obtained by the second processing of the step S14, after the second processing of the step S14, the processing of the step S15 is performed instead of performing the processing of the step S18.

Therefore, for example, when a specified value relating to the variable "Noff" showing the lighting number of times of LED is determined to be "1", the processing of the step S16 is performed and thus a correct detection that a skimmer 20 is not attached can be performed. In accordance with an embodiment, the specified value is set to be "1" but the specified value may be "2" or more.

As described above, in accordance with an embodiment shown in FIG. 7 and FIGS. 8(a) through 8(d), it can be accurately judged whether a skimmer 20 is attached to the card reader 1 or not. Especially, as described with reference to FIG. 8(d), while the light emitting body 50a is turned on or emits light flickeringly at random (or pseudo-random) time intervals and, when the light receiving sensor 50b receives invisible light at the time interval coinciding with the flickering light emission of the light emitting body 50a, it is judged that a foreign matter is attached to the outside of the front panel. Therefore, even when a periodical pulse-shaped external light is incident on the light receiving sensor 50b, a foreign matter can be accurately detected.

Next, a case will be described below in which an equal continuous level (steady state) light such as sun light is incident from the outside, for example, from a gap space between the shading filter 13 and the front panel, and in which a skimmer 20 is attached. In this case, the level of the sensor output of the photo reflector 50 is shifted as a whole by the amount of the external light, in other words, the entire sensor output is increased with a constant value by the external light. Therefore, the output measurement of light receiving sensor 50b (step S13 in FIG. 7) at the time of turning off the light of the LED may not be correctly performed. Therefore, in the step S6 and the step S14 in FIG. 7, it is preferable that an updating process, by which the specified slice level that is a judging reference is changed, is performed.

FIGS. 9(a) through 9(c) are waveform diagrams showing states where the slice level is updated. Especially, FIG. 9(a) is a waveform diagram showing the lighting (turned ON) timing of the light emitting body 50a, FIG. 9(b) is a waveform diagram before the slice level is updated, and FIG. 9(c) is a waveform diagram after the slice level is updated. Further, FIG. 10 is a flow chart showing the flow of information processing when a slice level is updated.

In FIG. 7 and FIG. 9(b), at the time of first processing (output measurements) of the step S5 and the step S13 in FIG. 7 (see the arrow "A" and the arrow "B" shown in FIG. 9(b)), at the position of the arrow "A", the sensor output is larger than the specified slice level (slice level "P") but, at the position of the arrow "B", the sensor output is not less than the specified slice level (slice level "Q") because of the level shift due to the external light (see FIG. 9(b)). Therefore, in the former case, the processing of the step S10 is performed after the judgment processing of the step S6 (step S6: YES) but, in the latter case, the processing of the step S15 is performed instead of the step S18 after the judgment processing of the step S14 (step S14: NO). After that, when the process from the step S14 to the step S15 is repeated a specified number of times, finally the judgment processing of the step S15 becomes "YES" and thus it is judged that a skimmer 20 is not attached in the card reader 1 (step S16). However, this is an erroneous detection.

Therefore, an information processing (updating processing of the specified slice level) shown in FIG. 10 is performed before "detection start" in the flow chart shown in FIG. 7. Specifically, first, after the LED is turned off (step S21), the output of a light receiving sensor is measured (step S22).

Next, it is judged whether the level of the sensor output is a rewritable level or not (step S23). Specifically, it is judged whether the level shift due to external light is within a level, which is capable of being coped with by updating of the slice level, or not. When the sensor output is not in a level that is rewritable, in other words, when the intensity of the external incident light is too large, it is judged that a skimmer 20 is not attached and the detection process is ended (step S24). On the other hand, when the output is in a level, which is rewritable, the slice value (slice level) is updated (step S25).

Specifically, as shown in FIG. 9(c), at the timing "O" before the output measurement in the light receiving sensor 50b is performed, the slice level is updated. Therefore, the slice level "P" (see FIG. 9(b)) which is to be judged as "ON" is changed to the slice level "R" (see FIG. 9(c)) and the slice level "Q" (see FIG. 9(b)) which is to be judged as "OFF" is changed to the slice level "S" (see FIG. 9(c)). As a result, in the waveform diagram before the slice level is updated, although the output measurements at the points of the arrow "B", the arrow "D", the arrow "F" and the arrow "H" are erroneous detections ("judgment NG") (see FIG. 9(b)), in the waveform diagram after the slice level is updated, the output measurements at the points of the arrow "B", the arrow "D", the arrow "F" and the arrow "H" are correct detections ("judgment OK") (see FIG. 9(c)).

In this manner, since the output measurement is performed (step S26 in FIG. 10) after the slice level has been updated in a proper value (step S25 in FIG. 10), an erroneous detection that it is judged due to the external light, that a skimmer 20 is not attached although the skimmer 20 is attached in the card reader 1, can be prevented.

FIG. 11 is an explanatory schematic view showing an outline on the failure diagnosis of a photo reflector.

In FIG. 11, a cover 30 (the shading filter 13 in FIG. 1) is disposed in the front of the light emitting body (LED) 50a and the light receiving sensor (photo sensor) 50b. The cover 30 (the shading filter 13 in FIG. 1) is structured by using material that transmits infrared light but the cover 30 slightly reflects the infrared light. Therefore, a failure diagnosis can be performed by detecting the reflected light with the light receiving sensor 50b.

FIG. 12 is a flow chart showing a flow of information processing when the failure diagnosis of the photo reflector is performed.

In FIG. 12, for example, at the time of turning on the power supply of a device or at an irregular timing, firstly the light emitting body (LED) 50a is turned on and lighted (step S31). Immediately after that, the sensor output of the light receiving sensor 50b is measured (step S32). The measured value at this time is set to be "S1". Next, the light emitting body 50a is turned off (step S33). Immediately after that, the sensor output of the light receiving sensor 50b is measured (step S34). The measured value at this time is set to be "S0". In accordance with an embodiment, similarly to the above-mentioned embodiment, the LED on/off control circuit 51 performs the control of the light emitting body in the step S31 and the step S33 and the CPU 54 performs the output measurement in the step S32 and the step S34.

After that, it is judged by the CPU 54 whether the measured value (S1-S0) is not less than a specified value or not. The subtraction processing of (S1-S0) is performed to cancel the adverse effect (level shift) of external light. When it is judged that the measured value is not less than the specified value, the sensor output from the light receiving sensor 50b is measured in a normal manner depending on the on-and-off of the light emitting body 50a and thus it is judged that the sensor is normal and the self diagnosis is ended (step S37). On the other hand, when it is judged that the measured value does not reach the specified value, in other words, in the case that the sensor output from the light receiving sensor 50b is hardly changed even when the light emitting body 50a is turned on or off, it is judged that the sensor failure occurs and an alarm is transmitted to a host device (step S36).

As described above, the light emitting body 50a is turned on and lighted and, when the light receiving output (sensor output) on the light receiving sensor 50b is less than a specified value (step S35: NO), it is judged that abnormality occurs in the light receiving sensor 50b. Therefore, the card reader 1 can be provided with a self-diagnosis function for failure of the light receiving sensor 50b.

As described with reference to FIG. 1(a) through FIG. 12, in the card reader 1 in accordance with the embodiment described above, the photo reflector 50 is disposed in the inner side of the device with respect to the shading filter 13, which is disposed at least one part of the front panel 10, as a sensor for detecting a skimmer 20. Therefore, it is difficult that the photo reflector 50 is visually confirmed from the outside and thus a function for preventing an illegal reading (security performance) can be improved. Further, since the photo reflector 50 is disposed so as to match with the position of the magnetic head 21 provided in the skimmer 20 (see FIG. 3), the detection accuracy for the skimmer 20 can be improved. Further, since the infrared light is emitted from the photo reflector 50, an illegal person cannot recognize the sensor light by naked eyes and thus the sensor can be prevented from being noticed by the illegal person. Further, in the case that the entire lower part of the opening 10a is formed with the shading filter 13, the sensor can be further surely prevented from being noticed by the illegal person. In addition, as described with reference to FIG. 7 through FIG. 10, adverse effects due to external light (pulse-shaped external light or roughly equal and continuous level of external light) can be prevented and, as described with reference to FIG. 11 and FIG. 12, a self-diagnosis function for failure can be obtained.

In the card reader 1 described above, the light emitting body 50a is disposed in the inside of the device (the inner side with respect to the shading filter 13). However, the light emitting body 50a may be disposed, for example, on the outside of the device. In other words, the shading filter 13 is structured so as to transmit invisible light and the photo reflector 50 is structured so as to be comprised of the light receiving sensor 50b which receives invisible light, and the light emitting body 50a which emits invisible light may be disposed on the outside of the device. According to the structure described above, the light emitting body 50a can be easily exchanged while the illegal reading preventing function is improved similarly to the embodiment described above.

Further, in the card reader 1 described above, the detection of a foreign matter is performed in a card waiting state where a magnetic card will be inserted. However, the detection of a foreign matter may be performed whenever the insertion of a magnetic card is detected. In this case, the detection of a foreign matter is performed frequently and thus the security performance can be improved.

Further, in the card reader 1 described above, when the CPU 54 detects a foreign matter (skimmer 20), a warning is notified to the host device. However, for example, a warning that the information of a magnetic card is illegally read may be notified to a user by using a display (not shown) before the magnetic card is ejected, or a processing in the magnetic card may be suspended. Alternatively, for example, the shutter 18 may be kept to be closed. According to the structure described above, since a magnetic card is not completely inserted into the card reader 1, recorded information on the magnetic card can be prevented from being completely read.

Further, the card reader 1 described above is a motor-driven type of a card reader but, for example, the present invention may be applied to a DIP type of a card reader. FIG. 13 is a view showing a state where the photo reflector 50 is mounted on a DIP type of a card reader 1A. In this case, similarly to the card reader 1, the detection region of the photo reflector 50 is set to be a region where the photo reflector 50 faces the passage of the magnetic stripe of a magnetic card. In accordance with an embodiment, the position of the photo reflector 50 is preferably disposed in front of a pre-head (see FIG. 13).

The photo reflector 50 may be mounted, for example, on a swipe type of a card reader as well as a DIP type of a card reader shown in FIG. 13. FIG. 14 is a view showing a state where the photo reflector 50 is mounted on a swipe type of a card reader. In this case, the photo reflector 50 is disposed on an insertion side in a card swipe direction and on the side on which a magnetic head is mounted (see FIG. 14).

A medium processing device in accordance with the present invention is effectively applicable to an application for improving an illegal reading preventing function and for reducing an erroneous detection due to external light to enhance reliability.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A medium processing device comprising:
    a front panel which is formed with an aperture where a magnetic recording medium is inserted into or ejected from and which partitions an outside of a device from an inside of the device;
    a magnetic head which is provided in the inside of the device for writing or reading information in or from the magnetic recording medium;
    a shading filter which is provided in at least one part of the front panel for shading visible light; and
    a foreign matter detecting mechanism which is provided on an inner side of the device with respect to the shading filter for detecting a foreign matter that is attached to the outside of the device;
    wherein the foreign matter detecting mechanism comprises a light emitting body which emits invisible light and a light receiving sensor which receives the invisible light, and the shading filter transmits the invisible light.

2. The medium processing device according to claim 1, wherein the invisible light is infrared light.

3. The medium processing device according to claim 2, wherein the foreign matter detecting mechanism comprises a light emission control section which controls the light emitting body and a comparing section which compares an emitted light from the light emitting body with a received light in the light receiving sensor.

4. The medium processing device according to claim 3, wherein the light emitting body in the foreign matter detecting mechanism is emitted flickeringly at random or pseudo-random time intervals and, when the light receiving sensor receives the invisible light at time intervals that coincide with time intervals of emitting light from the light emitting body, it is judged that a foreign matter is attached to the outside of the front panel.

5. The medium processing device according to claim 1, wherein the invisible light is emitted from the light emitting body in the foreign matter detecting mechanism at the time of turning on a power source of the device and, when an output of received light in the light receiving sensor is not more than a specified value, it is judged that abnormality occurs in the foreign matter detecting mechanism.

6. A medium processing device comprising:
    a front panel which is formed with an aperture where a magnetic recording medium is inserted into or ejected from and which partitions an outside of a device from an inside of the device;
    a magnetic head which is provided in the inside of the device for writing or reading information in or from the magnetic recording medium;
    a shading filter which is provided in at least one part of the front panel for shading visible light; and
    a foreign matter detecting mechanism which is provided on an inner side of the device with respect to the shading filter for detecting a foreign matter that is attached to the outside of the device;
    wherein the shading filter transmits invisible light, the foreign matter detecting mechanism comprises a light receiving sensor for receiving the invisible light, and a light emitting body for emitting invisible light is provided in the outside of the device.

7. The medium processing device according to claim 1 or 6, wherein the foreign matter detecting mechanism performs detection for a foreign matter in a waiting state for insertion of the magnetic recording medium or at a time when the insertion of the magnetic recording medium is detected.

8. The medium processing device according to claim 1 or 6, wherein the magnetic recording medium is a card having a magnetic stripe, and a detection region of the foreign matter detecting mechanism is set to be a region which faces a passage of the magnetic stripe of the card.

9. The medium processing device according to claim 1 or 6, wherein a warning is notified to a user or to a host device, or a processing to the magnetic recording medium is suspended, when the foreign matter detecting mechanism detects the foreign matter.

* * * * *